March 29, 1932. I. HECHENBLEIKNER 1,851,179
MANUFACTURE OF PHOSPHORIC ACID
Filed Feb. 25, 1930
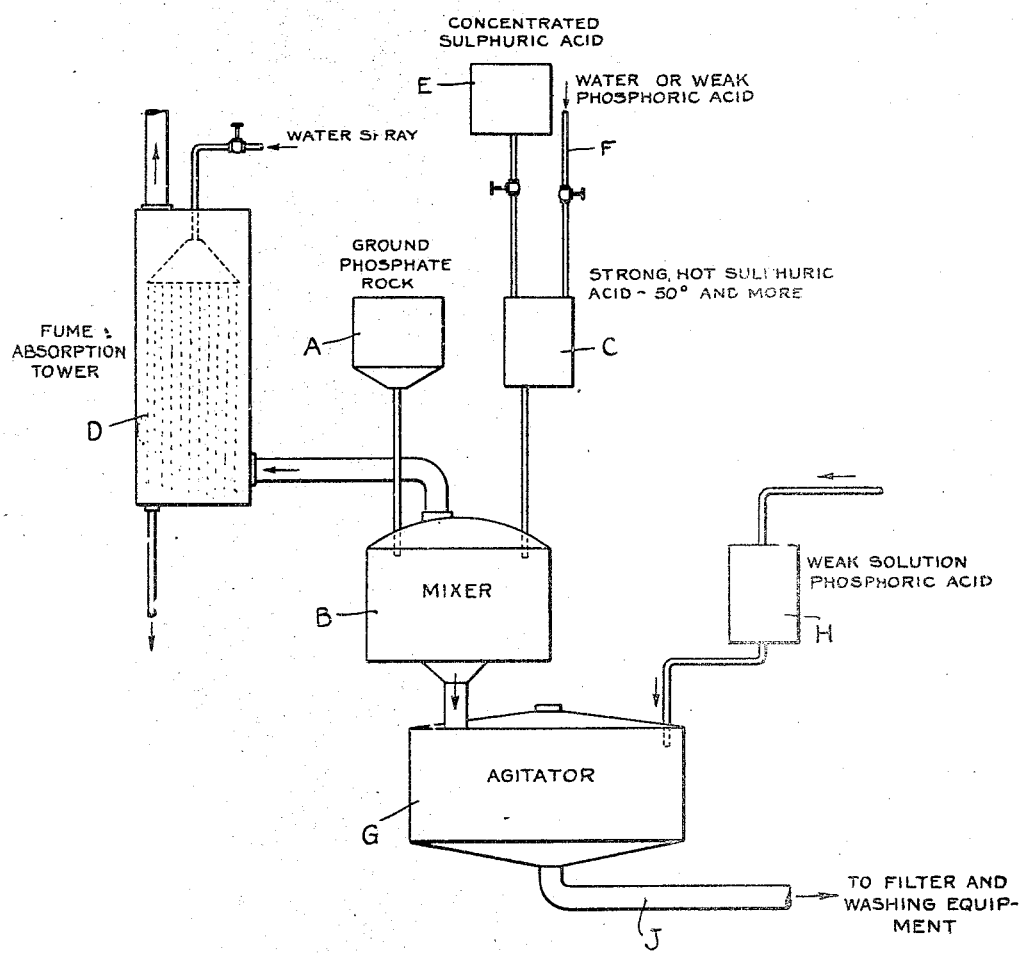
INVENTOR
Ingenuin Hechenbleikner
BY
ATTORNEYS Patented Mar. 29, 1932

1,851,179

UNITED STATES PATENT OFFICE

INGENUIN HECHENBLEIKNER, OF CHARLOTTE, NORTH CAROLINA, ASSIGNOR TO CHEMICAL CONSTRUCTION CORPORATION, OF CHARLOTTE, NORTH CAROLINA, A CORPORATION OF DELAWARE

MANUFACTURE OF PHOSPHORIC ACID

Application filed February 25, 1930. Serial No. 431,177.

This invention relates to the manufacture of phosphoric acid, and more particularly to a method and means for manufacturing phosphoric acid from phosphate rock and sulphuric acid.

One of the known methods of manufacturing phosphoric acid from phosphate rock is by the sulphuric acid route. In this method the phosphate rock, which largely contains calcium salts of phosphoric acid, is reduced by treatment with phosphoric acid and then caused to react with sulphuric acid in order to obtain calcium sulphate and phosphoric acid. From the resulting mixture or slurry the phosphoric acid is separated.

Considerable trouble and difficulty arises in the practice of this method when using phosphate rock containing a high percentage of compounds of fluorine. The fluorine forms a hydrofluo-silicic acid which is deposited on surfaces in the form of a hard crusty formation. This formation builds up on the various pieces of apparatus used in the plant, and tends to stop up pipe lines and the like. Furthermore, fluorine or its acids react with and cause undesirable disintegration of lead and other of the construction materials used in the plant apparatus. The primary object of the present invention is to overcome this difficulty, and this is accomplished, generally speaking, by eliminating fluorine and the acids thereof in the first stage of the operation of the plant. I have found that by treating the ground phosphate rock first with sulphuric acid, and especially with hot sulphuric acid of a desired concentration, the acid will react with the rock to release fluorine compounds, particularly hydrofluoric acid or hydrogen fluoride in gaseous form, and the resulting gases may be carried off from the mixture, thereby freeing the remainder of the phosphoric acid manufacturing plant from the difficulties above mentioned.

The manufacturing process as usually applied requires considerable expensive apparatus because a number of mixers and large expensive agitators are needed in which the desired reaction takes place in successive stages. One of the objects of my invention is to reduce the amount of apparatus required, and this desirable reduction in apparatus is also made possible by the changed process above outlined because when strong hot sulphuric acid is used with ground or comminuted phosphate rock the reaction is completed in the first mixing.

Still another object of my invention is to obtain the desired supply of hot sulphuric acid with practically no cost for heating the same. Sulphuric acid is used which is greater in concentration than is desired for the present reaction, this strong acid being readily obtained, for example, from manufacture by the contact process, and the strong acid is diluted to the desired concentration by water or a weak solution of phosphoric acid. The mixing of the strong acid with water generates considerable heat, and in this way hot sulphuric acid of the desired concentration is obtained without using concentrators and without using heating equipment.

The desired phosphoric acid is obtained by separating it from the mixture of calcium sulphate and phosphoric acid, which results from the reaction previously outlined. Still another object of the present invention is to facilitate this separation, and to this end the mixture has added thereto a weak solution of phosphoric acid in order to give the mixture a strength and consistency best suited for the separation stage.

To the accomplishment of the foregoing and such other objects as will hereinafter appear, my invention consists in the method and the apparatus elements and their relation one to the other as hereinafter are more particularly described in the specification and sought to be defined in the claims. The specification is accompanied by a drawing, the single figure of which is a schematic or flow diagram of the reaction stage of the process.

The manufacture of phosphoric acid by the sulphuric acid route may, in general, be divided into two stages, a reaction stage, and a separation stage. My invention deals more particularly with the reaction stage and inasmuch as the separation stage may coincide with that already used in this art, the drawing discloses the flow relations in only the first or reaction stage of the process.

The phosphate rock is first broken up and then ground in a suitable grinding mill after which the ground rock may be fed to a mixer. This has been indicated in simple form in the accompanying drawing by a hopper A, acting as a source of ground phosphate rock, which may be fed as desired to a mixer B. The ground rock is mixed directly with hot sulphuric acid supplied from a tank C to the mixer B. This sulphuric acid should have a concentration of 50 degrees Baumé or more in addition to being hot, and under these conditions I have found that the reaction proceeds favorably and rapidly with the evolution of practically all of the fluorine contained in the phosphate rock, ordinarily in the form of hydrogen fluoride or hydrofluoric acid. The gases escaping from the mixer B may be led to a washing tower or fume absorption tower D, from which the hydrofluoric acid may, if desired, be recovered.

The acid in the tank C is preferably obtained by mixing sulphuric acid of greater concentration, which may readily and economically be obtained by the contact process of manufacturing sulphuric acid, and which is indicated as supplied from a tank E, with water or, if desired, with weak phosphoric acid, which may be obtained from the washing apparatus ordinarily used in the separation stage of the plant and here indicated as supplied through a pipe F. The mixture is made in proper proportion to make the acid in the tank C of the desired concentration, and at the same time sufficient heat is evolved to bring the acid to the desired temperature preparatory to its use in the mixer B.

The mixer B may be a standard mixer, and the ground phosphate rock from the hopper A and the hot strong sulphuric acid from the tank C are mixed together in the mixer B in proper proportions for leaching out all of the phosphoric acid in the rock. This reaction takes place in a single stage, thereby economizing in apparatus and avoiding having this reaction continue in the agitator, as well as dispensing with the necessity of having a plurality of agitators. In the present arrangement a single agitator indicated at G is sufficient, and the contents from the mixer B are emptied into the agitator G at suitable times when the reaction is completed.

The agitator G may be of conventional type and is supplied with a weak solution of phosphoric acid from the tank H. The object of mixing the slurry with the weak phosphoric acid is to give the mixture in the agitator a desired strength and consistency most suitable for conveying it to the separation stage of the plant, which is done through the conduit J.

The separation stage may be of customary type, consisting essentially of filtering equipment for separating the desired relatively strong phosphoric acid, say 30 degrees Baumé or more, from the calcium sulphate residue, and washing equipment in which the residue is washed to remove any remaining phosphoric acid, this being obtained in the wash water as a weak phosphoric acid.

Part or all of this wash water or weak phosphoric acid may be supplied to either or both of the elements F and H above described, for mixture with the strong sulphuric acid, or with the rock mixture or slurry preparatory to the filtration of phosphoric acid therefrom.

The method of practicing my invention, the necessary apparatus therefor, and the advantages of the invention will in the main be apparent from the foregoing description thereof. The fluorine is removed from the phosphate rock, and this removal is accomplished at the very beginning of the process, thereby obviating the extremely troublesome difficulties heretofore caused thereby. The removal of the fluorine is accomplished without adding extra steps to the phosphoric acid manufacturing process and, in fact, while reducing the number of steps used therein and the apparatus necessary for the practice of the process, because the hot concentrated sulphuric acid mixed directly with the ground phosphate rock not only releases the fluorine, but also yields phosphoric acid from the phosphate rock in a more rapid and efficient manner than has heretofore been the case. The desired hot concentrated sulphuric acid may be obtained in a simple manner by diluting more concentrated acid.

In some of the appended claims I shall refer to the fluorine generally, by which I mean to include fluorine compounds and particularly hydrogen fluoride or hydrofluoric acid.

It will be apparent that while I have shown and described my invention in the preferred form, many changes and modifications may be made in the method and apparatus disclosed without departing from the spirit of the invention, defined in the following claims.

I claim:

1. In the manufacture of phosphoric acid from phosphate rock by a process generally resembling the Dorr process, the said phosphate rock containing a relatively high percentage of fluorine compounds, the method of initially removing the fluorine in order to prevent fouling of the apparatus by fluorine compounds, and of quickening the process and simplifying the process and apparatus therefor, which includes grinding the rock, mixing the ground rock directly with hot concentrated sulphuric acid of 50° Baumé or more in a single mixing stage, withdrawing all of the resulting fumes from the mixing stage, agitating the slurry from the mixer and adding thereto a weak solution of phosphoric acid in order to obtain a desired strength and consistency of mixture, and finally separating the phosphoric acid from the mixture.

2. In the manufacture of phosphoric acid from phosphate rock by a process generally resembling the Dorr process, the said phosphate rock containing a relatively high percentage of fluorine compounds, the method of initially removing the fluorine in order to prevent fouling of the apparatus by fluorine compounds, and of recovering the fluorine, and of quickening the process and simplifying the process and apparatus therefor, which includes grinding the rock, mixing the ground rock directly with hot concentrated sulphuric acid of 50° Baumé or more in a single mixing stage, withdrawing all of the resulting fumes from the mixing stage and passing the same through a fume absorption tower, agitating the slurry from the mixer in a single agitator stage and adding thereto a weak solution of phosphoric acid in order to obtain a desired strength and consistency of mixture, and finally separating the phosphoric acid from the mixture.

3. In the manufacture of phosphoric acid from phosphate rock by a process generally resembling the Dorr process, the said phosphate rock containing a relatively high percentage of fluorine compounds, the method of initially removing the fluorine in order to prevent fouling of the apparatus by fluorine compounds, and of quickening the process and simplifying the process and apparatus therefor, which includes grinding the rock, mixing very highly concentrated sulphuric acid with an aqueous liquid in order to obtain hot sulphuric acid having a concentration of 50° Baumé or more, mixing the ground rock directly with the resulting hot concentrated sulphuric acid in a single mixing stage, withdrawing all of the resulting fumes from the mixing stage, agitating the slurry from the mixer in a single agitator stage and adding thereto a weak solution of phosphoric acid in order to obtain a desired strength and consistency of mixture, and finally separating the phosphoric acid from the mixture.

Signed at Charlotte, in the county of Mecklenberg and State of North Carolina, this 21 day of February A. D. 1930.

INGENUIN HECHENBLEIKNER.